United States Patent [19]

McCann

[11] 4,401,070

[45] Aug. 30, 1983

[54] ROTARY ENGINE

[76] Inventor: James L. McCann, 975 E. Broadway, Vancouver, British Columbia, Canada, V5T 1Y3

[21] Appl. No.: 249,620

[22] Filed: Mar. 31, 1981

[51] Int. Cl.³ .................... F02B 53/00; F02B 53/02
[52] U.S. Cl. .................................. 123/229; 123/231
[58] Field of Search ............... 123/229, 231, 235, 236

[56] References Cited

U.S. PATENT DOCUMENTS

| 969,353 | 9/1910 | Evans. | |
|---|---|---|---|
| 1,362,400 | 12/1920 | Deubel | 123/235 |
| 1,412,296 | 4/1922 | Stowe | 123/235 |
| 1,464,408 | 8/1923 | Collier | 123/235 |
| 1,745,682 | 3/1924 | McAssey | 123/231 |
| 2,818,839 | 1/1958 | Voigt | 123/235 |
| 3,730,145 | 5/1973 | Bennetto | 123/235 |
| 3,820,515 | 6/1974 | Knisch | 123/236 |
| 3,942,484 | 3/1976 | Pile | 123/235 |
| 4,096,846 | 6/1978 | Biles | 123/228 |

FOREIGN PATENT DOCUMENTS

| 530093 | 9/1956 | Canada | 123/236 |
|---|---|---|---|
| 677358 | 1/1964 | Canada | 123/235 |
| 631254 | 6/1936 | Fed. Rep. of Germany | 123/235 |
| 2152775 | 4/1973 | Fed. Rep. of Germany | 123/228 |
| 2346150 | 3/1975 | Fed. Rep. of Germany | 123/228 |
| 55-75501 | 6/1980 | Japan | 123/236 |

*Primary Examiner*—William R. Cline
*Assistant Examiner*—John M. Kramer
*Attorney, Agent, or Firm*—Carver & Co.

[57] ABSTRACT

An internal combustion engine has a rotor and a vane extending slidably through the rotor in a transverse direction for rotation therewith. The vane has opposite ends extendable beyond the rotor. A stator has a hollow, cylindrical interior. The rotor is rotatably received within the interior. The stator has opposite side walls with circumferentially extending depressions therein. The depressions are shaped to slidably receive the ends of the vane in sealing contact. The depressions of the opposite walls are staggered, causing transverse reciprocation of the vane as the rotor is rotated.

5 Claims, 9 Drawing Figures

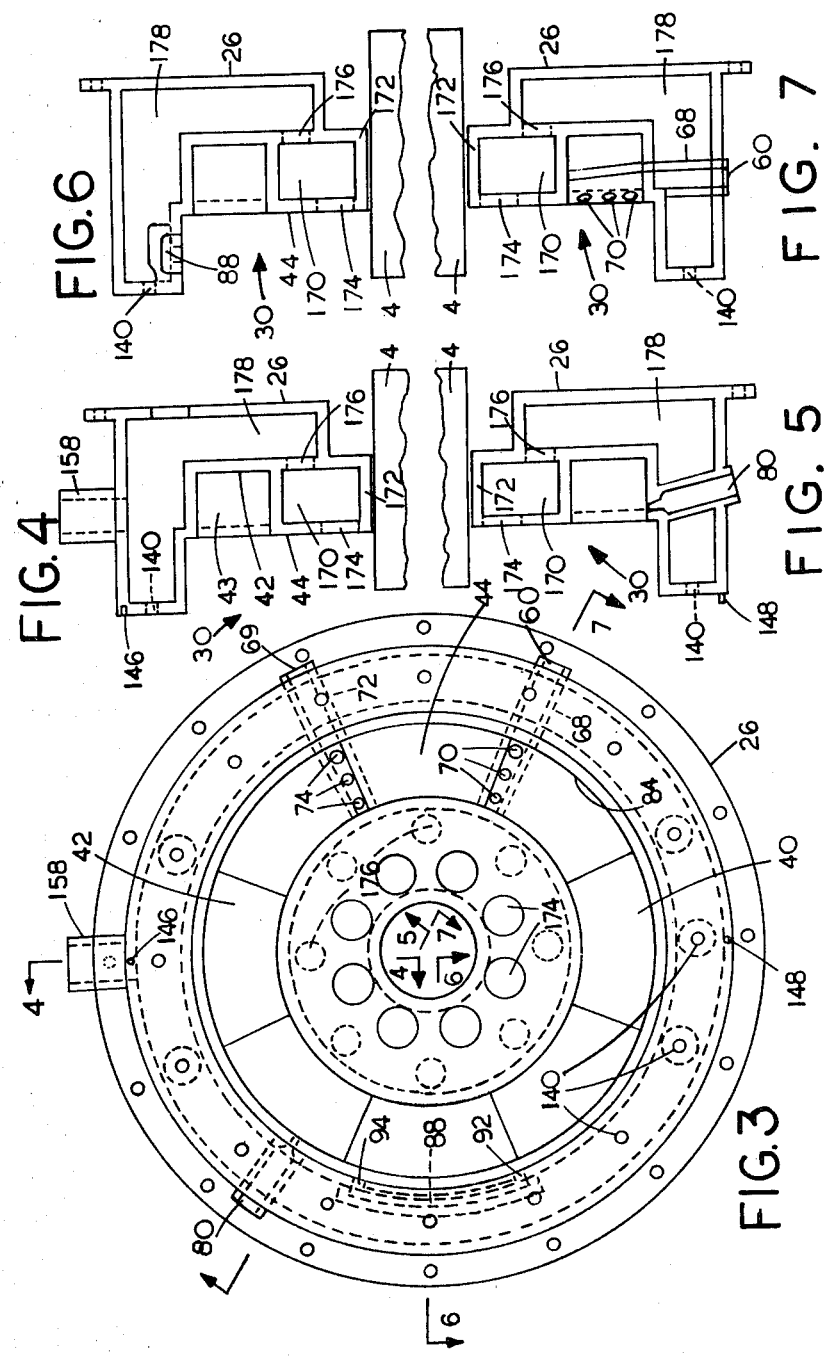

ROTARY ENGINE

BACKGROUND OF THE INVENTION

The invention relates to a rotary internal combustion engine having a vane extending slidably through the rotor in a transverse direction for rotation with the rotor and transverse reciprocation.

The standard reciprocating engine used in automobiles has both a relatively small mechanical efficiency and fuel efficiency. One reason for this is the short stroke of the engine. The limited amount of time possible for the power stroke leads to incomplete detonation. The inefficiency increases with engine speed because the time for combustion is correspondingly reduced.

Another advantage of the conventional piston engine results from valve overlap. Since both exhaust and intake valves are open at the same time, a portion of the air/fuel mixture is exhausted unburned.

The thermal efficiency of the reciprocating engine is also considerably less than optimal. Detonation occurs before top dead center and so expansion of the gases causes the mixture to heat up rather than provide work energy.

A large number of rotary engines have been designed or built in an attempt to overcome such problems with piston engines and to reduce the number of working parts. Many of these have inherent problems which have impeded their development or widespread acceptance. For example, the only mass-produced rotary internal combustion engine has been the Wankel (trade mark) engine which has suffered from rotor sealing problems in the past as well as fuel consumption higher than a piston engine of similar performance. Part of the reason for the sealing problems is the relatively high speed of the rotor.

SUMMARY OF THE INVENTION

According to the invention, an internal combustion engine comprises a rotor and a vane extending slidably through the rotor in a transverse direction for rotation therewith. The vane has opposite ends extendable beyond the rotor. There is a stator with a hollow, cylindrical interior, the rotor being rotatably received within the interior. The stator has opposite side walls with circumferentially extending recesses therein. The recesses are shaped to slidably receive the ends of the vane in sealing contact. The recesses of the opposite walls are staggered, causing transverse reciprocation of the vane as the rotor is rotated. Air is compressed within the recesses and exhaust gases are purged from the recesses forwardly of the vane in a rotational direction of the vane. Air is taken into the recesses rearwardly of the vane in a direction opposite the direction of rotation and an air/fuel mixture is ignited within the recesses rearwardly of the vane to propel the rotor in the rotation direction.

A rotary engine according to the invention overcomes many of the problems associated with conventional piston engines and many other rotary engines. For example, the bore/stroke ratio is very large which increases the fuel burning time and the amount of power the fuel can produce. Valve overlap is completely eliminated and all of the exhaust gases are vented. Ignition starts after the power stroke begins, so the expanding gases produce work energy instead of heat. The mean effective pressure is substantially increased over that of a piston engine. Moreover, a large crank arm can be provided, increasing the efficiency of the engine.

BRIEF DESCRIPTION OF THE DRAWINGS

FIG. 3 is an elevational view of the half of the stator shown to the left in FIG. 1;

FIG. 4 is a section taken along line 4—4 of FIG. 3;

FIG. 5 is a section taken along line 5—5 of FIG. 3;

FIG. 6 is a section taken along line 6—6 of FIG. 3;

FIG. 7 is a section taken along line 7—7 of FIG. 3;

FIG. 8 is a section taken along line 9—9 of FIG. 8.

DESCRIPTION OF THE PREFERRED EMBODIMENT

Figure 1:
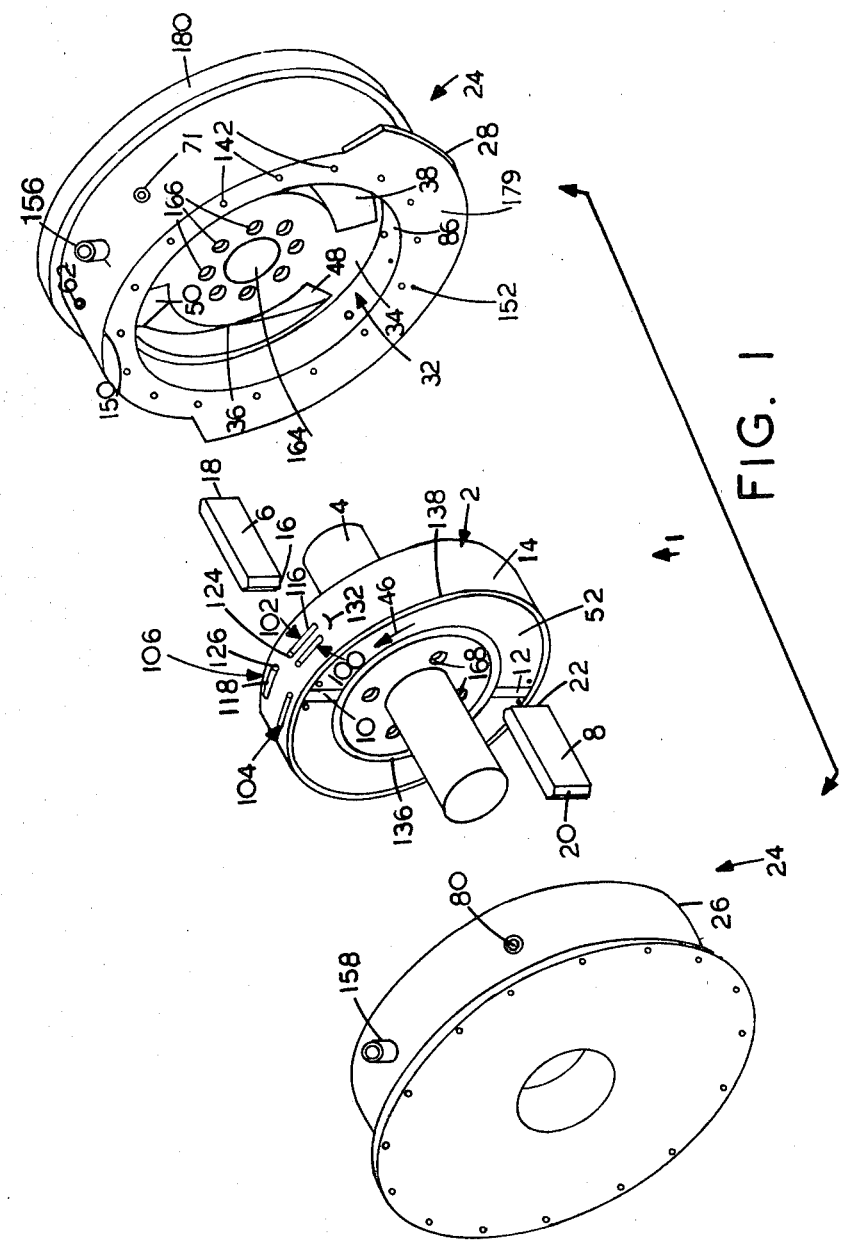
FIG. 1 is a perspective, exploded view of a rotary engine according to an embodiment of the invention.

Referring to the drawings, and in particular FIG. 1, rotary engine 1 includes a cylindrical rotor 2 which is rotatable about a power shaft 4. A pair of vanes 6 and 8 extend slidably through slots 10 and 12 in a transverse direction for rotation with the rotor. With reference to the engine, the transverse direction means a direction parallel to power shaft 4.

Figure 2:
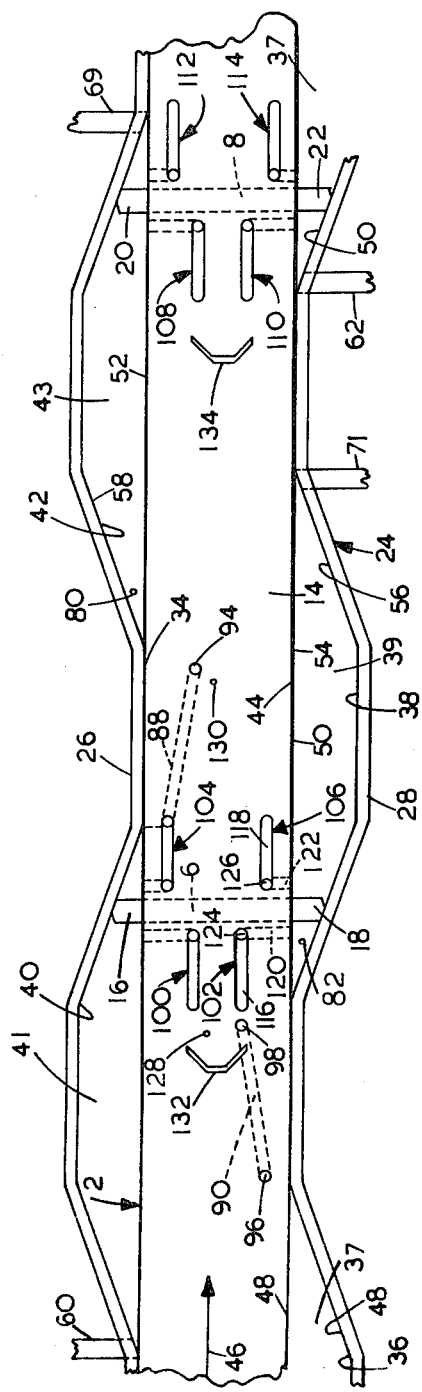
FIG. 2 is a flattened plan view showing the rotor, vanes and stator of the engine of FIG. 1.

As seen in FIG. 2 which presents a flattened view of outer annular surface 14 of the rotor, vane 6 has opposite ends 16 and 18 which extend beyond the rotor. Similarly, vane 8 has opposite ends 20 and 22.

The engine also includes a stator 24 comprising a first half 26 and a second half 28. Stator halves 26 and 28 have large cylindrical openings 30 and 32, respectively, which face each other. Cylindrical opening 32 is best seen in FIG. 1, while cylindrical opening 30 is shown in FIGS. 4 to 7. The cylindrical openings 30 and 32 form a hollow, cylindrical interior of the stator when the two halves are bolted together. Rotor 2 is rotatably received within the hollow cylindrical interior.

Referring to FIG. 1, the stator half 28 has a disc-shaped side wall 34 with a pair of circumferentially extending recesses 36 and 38 therein. Stator half 26 has corresponding recesses 40 and 42 in side wall 44 which is opposite side wall 34 as seen in FIGS. 2 and 3. The recesses are shaped to slidably receive the ends of the vanes in sealing contact. As seen, for example, for recess 42 in FIG. 4, each recess is rectangular in section. Each recess has a dimension in the radial direction of the rotor and stator just slightly greater than the radial dimension of the vane for sealing contact. The staggered arrangement of the recesses on opposite side walls of the stator causes transverse reciprocation of the vanes in the rotor in the direction of rotation indicated by arrows 46 in FIGS. 1 and 2. Air is compressed within the recesses and exhaust gases are purged from the recesses forwardly of the vanes. Forwardly refers to the rotational direction of the rotor. Air is taken into the recesses rearwardly of the vanes. Rearwardly is a direction opposite the direction of rotation. An air/fuel mixture is ignited within the recesses rearwardly of the vanes to propel the rotor in the rotational direction.

Referring to the structure of the preferred embodiment in more detail, it may be seen that the recesses have inclined surfaces near each end thereof. For example, recess 36 has an inclined surface 48, which is near the forward end of the recess in the direction of rotation of the rotor, and inclined surface 50, which is near the rear end opposite the forward end. Referring to FIG. 2, it may be seen chambers 37, 39, 41 and 43 are formed between the recesses 36, 38, 40 and 42 respectively and the side walls 50 and 52 of the rotor. The inclined surfaces near each end of the recesses means that the chambers taper towards the rotor at each end of the chambers. The inclined surface near the forward end of each recess of each of the side walls of the stator is opposite the inclined surface near the rear end of one of the recesses in the opposite side wall of the stator. For example, inclined surface 56 near the forward end of recess 38 is opposite the inclined surface 58 near the rear end of recess 42 of the opposite side wall of the stator due to the staggered positions of the recesses. As may be appreciated, when vane 6 reaches the proper rotational position, end 18 moves gradually out of the chamber 39, while the opposite end 16 gradually moves into the chamber 43.

The engine has intake means for the intake of air comprising intake ports 60 and 62 communicating with chambers 41 and 37 near the rear ends thereof with reference to the direction of rotation of the rotor. It may be seen in FIG. 8 that intake port 62 consists of a conduit 64 extending radially through the stator from the outer periphery thereof and three apertures 66 extending through side wall 34. Similarly, as seen in FIG. 3 and FIG. 7, intake port 60 consists of a conduit 68 extending radially through the stator and three apertures 70 through side wall 44. When the vanes move forwardly through the chambers 37 and 41, air is drawn through the intake ports to fill the chambers.

The engine also has exhaust means communicating with the chambers for purging the exhaust gases comprising exhaust ports 69 and 71. Exhaust port 69 consists of a conduit 72 extending radially from the outer periphery of the stator and three apertures 74 through the side wall 44 as seen in FIG. 3. Similarly, referring to FIG. 8, exhaust port 71 consists of conduit 76 extending radially through the stator from the periphery thereof and three apertures 78 through side wall 34. Exhaust gases are purged through exhaust ports 69 and 71 forwardly of vanes 6 and 8 as they move through the chambers 43 and 39 respectively.

Figure 8:
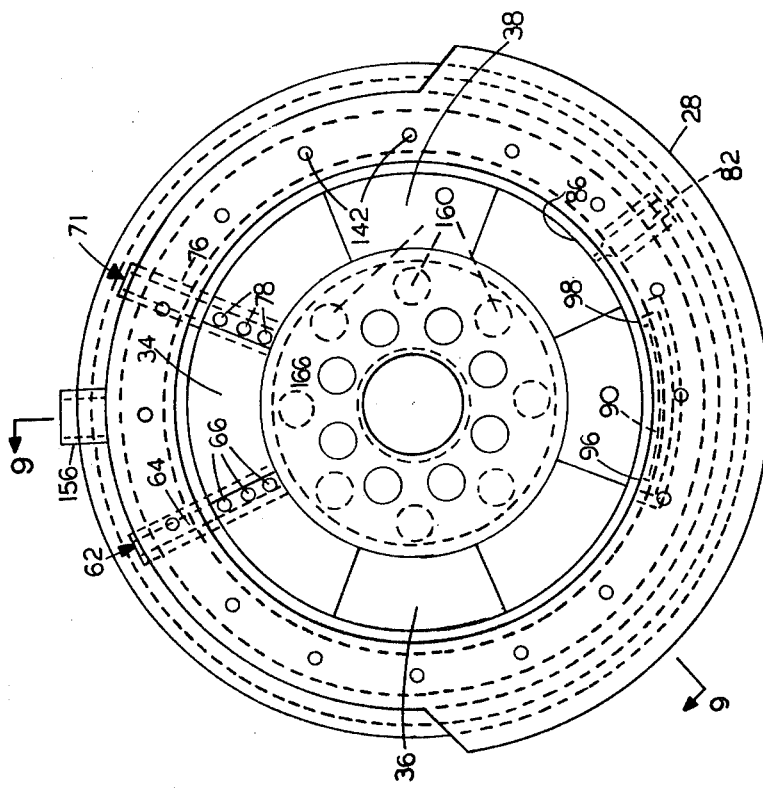
FIG. 8 is an elevational view of the half of the stator shown to the right in FIG. 1.

The engine also has fuel injectors 80 and 82 near the rear ends of chambers 43 and 39, respectively. Injectors 80 and 82 are best seen in FIG. 5 and FIG. 8, respectively. The fuel injectors inject fuel into the chambers 43 and 39 after the vanes have passed the fuel injectors and compressed air has entered the chambers behind the vane. The engine may be of the compression ignition type or, alternatively, spark plugs adjacent the injectors could provide the ignition means.

As described above, air is compressed in the chambers 37 and 41, but ignition and the power stroke occurs in the chambers 39 and 43. Engine 1 therefore has means for temporarily storing the compressed air received from near the forward ends of chambers 41 and 37 when the vanes are near the forward ends thereof and then transferring the compressed air rearwardly of the vanes after the vanes are in the chambers 39 and 43. The stator has an annular inner wall adjacent the annular outer wall 14 of the rotor. The annulr inner wall of the stator comprises annular wall 84 of stator half 26 as shown in FIG. 3 and annular wall 86 of stator half 28 as shown in FIG. 1 and FIG. 8. The means for storing and transferring the compressed air comprises the spaces or conduits 88 and 90 in walls 84 and 86 respectively. The conduits are below the surfaces of the annular walls, but have outwardly communicating apertures at each end, apertures 92 and 94 in the case of conduit 88 and apertures 96 and 98 in the case of conduit 90.

The means for storing and transferring also includes two sets of passageways on the rotor, each set of passageways being near one of the vanes so each set of passageways is spaced 180° apart as are the vanes. Passageways 100 and 102 are on the rearward side of vane 6, while passageways 104 and 106 are on the forward side of this vane. Similarly, passageways 108 and 110 are on the rearward side of vane 8 while passageways 112 and 114 are on its forward side. Each of the passageways consists of a longitudinal groove in the outer wall of the rotor, for example, grooves 116 and 118 of passageways 102 and 106. Each passageway also has a transverse bore communicating outwardly with the side wall of the rotor, for example, bores 120 and 122 of passageways 102 and 106. Finally, each passageway has a radial bore connecting the grooves and the transverse bore, for example, bores 124 and 126 of passageways 102 and 106. Passageways 104 and 112 serve to transfer compressed air from in front of vanes 6 and 8 respectively into conduit 88 as the vanes approach the forward end of chamber 41. As illustrated in FIG. 2, for example, in this rotational position of the rotor, passageway 104 is aligned with chamber 41 and with conduit 88 so the compressed air forwardly of end 16 of vane 6 is forced through the passageway into conduit 88. The compressed air is thus stored in conduit 88 after vane 6 passes chamber 41. In a similar manner, passageways 106 and 114 serve to transfer compressed air from chamber 37 into conduit 90.

After the vanes have passed the rearward ends of chambers 43 and 39, as well as fuel injectors 80 and 82, the compressed air is transferred from conduits 88 and 90 into these chambers rearwardly of the vanes. Passageways 100 and 108 serve to transfer the compressed air from conduit 88 to chamber 43, while passageways 102 and 110 transfer compressed air from conduit 90 to chamber 39. For example, just before the rotational position illustrated in FIG. 2, groove 116 of passageway 102 is aligned with aperture 98 of conduit 90. The compressed air passes between the groove and the inner wall of the stator, through bores 124 and 120 and enters chamber 39 rearwardly of end 18 of vane 6. With the compressed air introduced behind the vane, fuel can be injected by means of injector 82 and the mixture ignited to produce the power stroke within chamber 39. The same thing occurs in chamber 43.

Engine 1 has means for releasing compressed air from conduits 88 and 90 after most of the compressed air is transferred to chambers 39 and 43. It should be noted that some compressed air will remain within the conduits after passageways 100, 102, 108 and 110 have passed the position aligning the conduits with the chambers. Exhaust passageways 128 and 130, shown in FIG. 2, extend through the inner wall of the stator and communicate with the exhaust ports 69 and 71. A pair of generally U-shaped grooves 132 and 134 are formed on the outer annular wall 14 of the rotor rearwardly of the two sets of passageways. The grooves are positioned to align the exhaust passageways with conduits 88 and 90 after most of the compressed air is transferred to chambers 43 and 39. For example, groove 132 aligns exhaust passageway 128 and aperture 98 of conduit 90 just after the rotational position shown in FIG. 2.

Engine 1 is designed to operate at relatively low rotational speeds in the area of 500 revolutions per minute. Accordingly, sealing is not as much a problem as occurs with other rotary engines designed to operate at much higher speeds. The rotor has inner and outer circumferential seals on each side wall located radially inwards and radially outwards from the vanes, for example, seals 136 and 138 on side wall 52 of the rotor.

The vanes 6 and 8, as seen in FIG. 1, comprise substantially rectangular bars made with sufficiently close tolerances to fit sealingly and slidingly within slots 10 and 12 of the rotor. The ends of the vanes are radially flat and slightly pointed to provide adequate seals against the radially flat rear walls of the recesses.

The two halves 26 and 28 of the stator are connected together by bolts extending transversely through the circumferentially spaced-apart bolt holes 140 and 142 of the two halves 26 and 28, respectively. Access to the bolts is provided by cover plate 144 shown in FIG. 9. Alignment of the two halves of the stator is assured by the small recess 146 and pin 148 in stator half 26 shown in FIGS. 4 and 5, and the pin 150 and recess 152, shown in FIG. 1, shaped to mate therewith.

Coolant enters and leaves the engine through one of the coolant bibs 156 and 158 in stator halves 28 and 26, respectively. For example, the coolant may enter through cooling bib 156 and circulates through the annular internal chamber 159 of rotor half 28 shown best in FIG. 9. A plurality of apertures 160 near the radially inner part of chamber 159 permits the coolant to flow into the annular chamber 162 extending about journal 164 for one side of shaft 4. The coolant circulates out of chamber 162 by means of a plurality of apertures 166 in the side wall of stator half 28. From here, the coolant can pass through the four apertures 168 extending transversely through the rotor near shaft 4 and aligned with aperture 166. After passing through and cooling the rotor, the coolant enters annular chamber 170 about the journal 172, which supports shaft 4 in stator half 26, by means of a plurality of apertures 174 also aligned with apertures 168 of the rotor. From chamber 170, the coolant flows through a plurality of apertures 176 into the radially inner end of the main annular chamber 178 of stator half 26. The coolant flows out of the engine through the second cooling bib 158.

Figure 9:
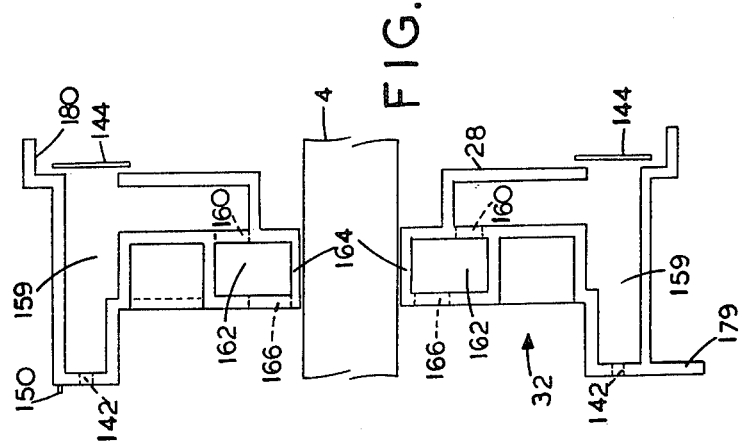

Referring to FIG. 1 and FIG. 9, it may be seen that the engine has an engine mount flange 179 and accessory mount flange 180, both on stator half 28.

Rotary engine 1 provides many advantages over conventional reciproacting engines as well as many rotary engines. For example, the structure is relatively simple, having only three moving parts, the rotor 2 and the two vanes 6 and 8. The engine is a split cycle engine as the vanes are employed in two strokes per end at the same time. The combinations are intake stroke with the rearward face and the compression stroke with the forward face or the power stroke with the rearward face and the exhaust stroke with the forward face. For example, referring to FIG. 2, the intake stroke is taking place rearwardly of end 16 of vane 6. After vane 6 passes chamber 41, the air within chamber 41 is compressed by the following vane 8. The air is compressed forwardly of vane 8 until it reaches the position of vane 6 shown in FIG. 2. At this point, passageway 112 is aligned with conduit 88 and the compressed air enters the conduit to complete the compression stroke. Accordingly, in the position of FIG. 2, end 16 of vane 6 is accomplishing both the intake stroke and the compression stroke. Vane 6 moves to the right of FIG. 2 in the direction of rotation past injection 80 until passageway 100 is aligned with conduit 88 and allows the compressed air to enter chamber 43 behind the vane 6. The fuel is then injected and the mixture ignited to provide the power stroke behind the vane. After the power stroke is completed and vane 6 has passed through chamber 43, the exhaust stroke is accomplished by end 20 of vane 8 which pushes the exhaust gases forwardly through exhaust port 69. Similarly, when end 16 of vane 6 enters chamber 43, it purges forwardly the exhaust gas from the previous power stroke of vane 8. It should be noted that, at the end of the power stroke, the next vane clears all of the exhaust gases through the exhaust port. There is no valve overlap, as occurs in piston engines, which results in a portion of the unburned mixture being exhausted. Each of the vanes fires twice every 360°, once at each end. Engine 1 therefore has four power strokes every 360° of rotation. This is equivalent to an eight cylinder four stroke engine where each piston fires every 720°.

The configuration of the engine is equivalent to that of a piston engine with an extremely large bore/stroke ratio. The time for combustion is correspondingly larger, increasing the engine efficiency. It should also be noted that ignition starts only after the power stroke begins unlike piston engines which fire before the top dead center position. The expanding gases accordingly provide work energy instead of heat energy. The engine has no crank to impede expansion of the fuel as in a piston engine.

What is claimed is:

1. An internal combustion engine comprising a stator having a cylindrical hollow with opposite side walls and an annular wall between the side walls; a rotor within the hollow mounted on a shaft, the rotor having side walls adjacent the side walls of the stator; circumferentially extending recesses in the side walls of the stator forming first and second chambers between the rotor and the side wall of the stator on each side of the rotor, the recesses having inclined surfaces which form tapering forward and rear ends of the chambers in the direction of rotation of the rotor, the chambers on one of the side walls of the stator being circumferentially displaced with respect to the chambers of the opposite side wall; vanes in the rotor capable of transverse reciprocation with respect to the direction of rotation of the rotor; intake and exhaust means connected to the recesses, the intake means communicating with each first chamber and the exhaust means communicating with each second chamber; means for transferring compressed air from each first chamber to the second chamber on the same side of the rotor, the means for transferring compressed air comprising conduits in the annular wall of the stator generally between, but not communicating with, the forward end of each first chamber and the rearward end of the second chamber on the same side of the rotor, a first passageway adjacent the rearward side of each vane in the direction of rotation of the rotor on each side of the rotor and a second passageway adjacent the forward side of each vane in the direction of rotation of the rotor on each side of the rotor, the passageways extending between the side walls of the rotor and the annular wall thereof, each first passageway connecting one of the first chambers to one of the conduits when the adjacent vane is near the forward end of the one first chamber, the second passageway on the same side of the rotor as said each first passageway connecting said one conduit to the second chamber on said same side of the rotor when said adjacent vane is near the rear end of the second chamber; and means for releasing the compressed air from the conduits to an exhaust outlet of the exhaust means comprising an exhaust passageway in the stator connected to the exhaust outlet and an opening in the annular wall of the rotor-located rearwardly of each of the first and second passageways in the direction of rotation of the rotor.

2. An internal combustion engine as claimed in claim 1, wherein the intake means is near the rear end of each first chamber and the exhaust means is near the forward end of each second chamber.

3. An internal combustion engine as claimed in claim 1, further comprising a fuel injector near the rear end of each second chamber.

4. An internal combustion engine as claimed in claim 1, wherein the opening of the means for releasing comprises a groove in the annular wall of the rotor.

5. An internal combustion engine as claimed in claim 1, further comprising inner and outer circumferential seals on each side wall of the rotor, the seals being located radially inwards and radially outwards of the vanes.

* * * * *